United States Patent [19]
König

[11] Patent Number: 4,928,740
[45] Date of Patent: May 29, 1990

[54] STUD LINK

[75] Inventor: Hubert König, Aalen, Fed. Rep. of Germany

[73] Assignee: Eisen- und Drahtwerk Erlau Aktiengesellschaft, Aalen, Fed. Rep. of Germany

[21] Appl. No.: 297,839

[22] Filed: Jan. 13, 1989

[30] Foreign Application Priority Data

Jan. 14, 1988 [DE] Fed. Rep. of Germany ... 8800326[U]

[51] Int. Cl.$^5$ .............................................. B60C 27/20
[52] U.S. Cl. .................................... 152/243; 152/226; 152/239
[58] Field of Search ............... 152/208, 210, 223, 225, 152/226, 227, 231, 243, 244, 171, 172, 232, 239, 240; 59/84, 85, 90, 91, 93

[56] References Cited

U.S. PATENT DOCUMENTS

| | | | |
|---|---|---|---|
| 2,728,371 | 12/1955 | McCarthy | 152/243 |
| 3,592,251 | 7/1971 | Muller | 152/243 |
| 3,709,275 | 1/1973 | Muller | 152/243 |
| 3,714,975 | 2/1973 | Muller | 152/243 |

Primary Examiner—Merrell C. Cashion, Jr.
Assistant Examiner—Gregory J. Wilber
Attorney, Agent, or Firm—Robert W. Becker & Associates

[57] ABSTRACT

A stud link for a tire chain, including a plate-like link body that has a tire contact surface and a wearing surface. The link body has at least one attachment hole for a chain link that is to be connected, and at least one central wearing element and two other wearing elements, one on each side of the central element. The wearing elements are disposed one after the other in a longitudinal direction of the stud link. At least one of the side faces of the central wearing element is recessed relative to the adjacent side faces of the other elements.

20 Claims, 1 Drawing Sheet

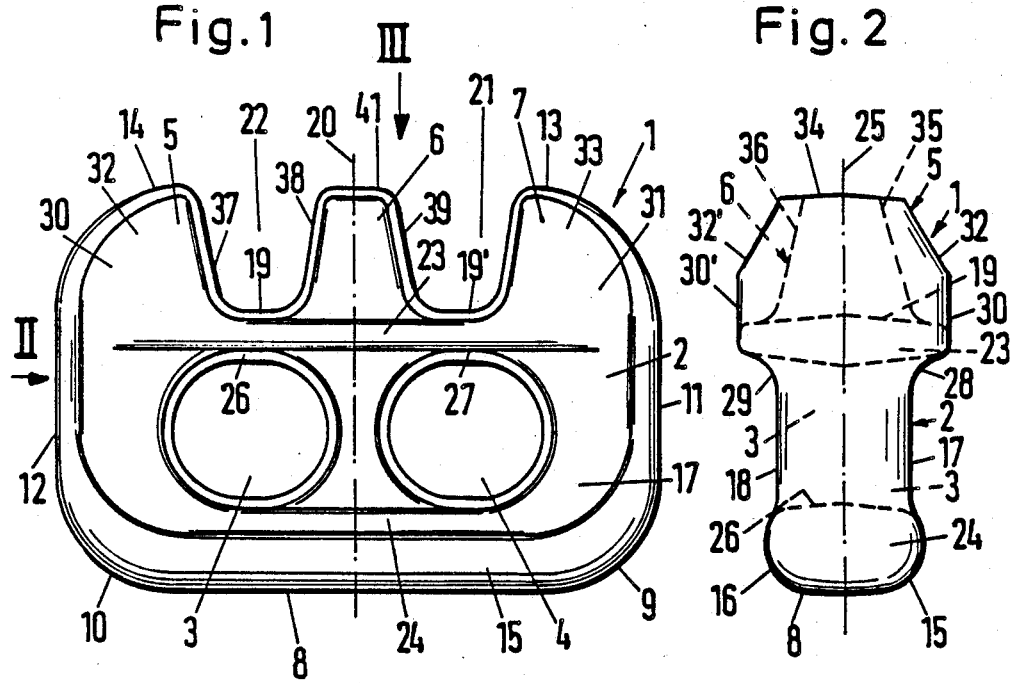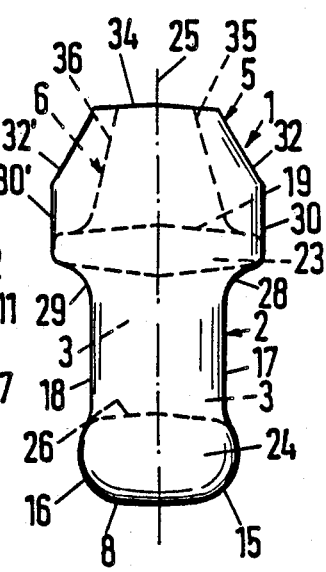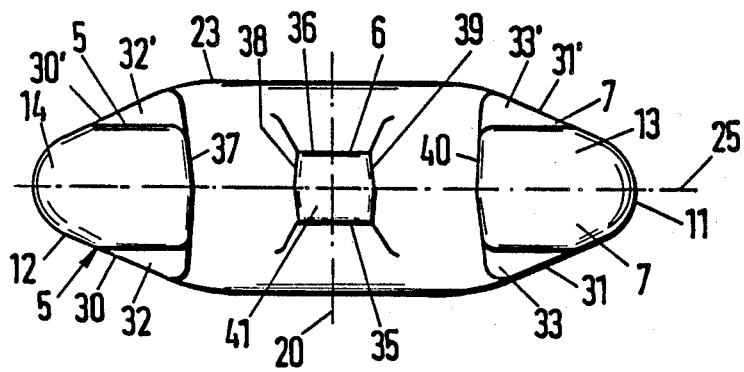

STUD LINK

BACKGROUND OF THE INVENTION

The present invention relates to a stud link for a tire chain, especially a tire protection chain, and includes a plate-like link body that has a tire contact surface and a wearing surface, with the link body having at least one attachment hole for a chain link that is to be connected, and at least one central wearing element and two other wearing elements, one on each side of the central wearing element, with the wearing elements, which are preferably wearing studs, being disposed one after the other in a longitudinal direction of the stud Link.

With one known stud link of this general type (German Gebrauchsmuster 69 37 715), the two other wearing elements have approximately the same width as does the remainder of the link body, while the central wearing element projects outwardly beyond the two side faces of the link body. Although this heretofore known stud link has very good traction, its service life is relatively short.

It is therefore an object of the present invention to embody a stud link of this general type in such a way that it has not only good traction but also a great resistance to wear.

BRIEF DESCRIPTION OF THE DRAWING

This object, and other objects and advantages of the present invention, will appear more clearly from the following specification in conjunction with the accompany schematic drawing, in which:

FIG. 1 is a side view of one exemplary embodiment of the inventive stud link;

FIG. 2 is an end view taken in the direction of the arrow II in FIG. 1; and

FIG. 3 is a top view taken in the direction of the arrow III in FIG. 1.

SUMMARY OF THE INVENTION

The stud link of the present invention is characterized primarily in that the wearing elements each have oppositely disposed side faces that extend essentially parallel to the longitudinal direction of the stud link, with at least one of the side faces of the central wearing element being recessed relative to the adjacent side faces of the other wearing elements.

As a consequence of the inventive construction, the wearing side of the stud link exhibits excellent traction and has a high wearing volume, so that the stud link, as a gripping link, is especially suitable for cross-country chains and tire protection chains. In addition, the inventive stud link is particularly suitable for tire chains having a rhombic or honeycombed tread or contact portion. As a result of the recessed construction of the central wearing element, a scalloped or indented configuration of the wearing side is provided as viewed transverse to the longitudinal direction of the stud link. The central wearing element acts in the manner of a spike that can engage in an excellent manner in the ground and therefore, when used in chains for earthmoving equipment, assures a great upright stability. The central wearing element also assures a high stability when the equipmemt operates on an incline. Due to the wider configuration of the other wearing elements relative to the central wearing elements, the traction of a chain provided with the inventive stud links is considerably improved as a result of the projecting edges of the other wearing elements. In addition, due to the inventive configuration of the stud link, the volume of the harder regions of the stud link provided in the region of the wearing side is increased, so that the service life of the inventive stud link is increased.

Further specific features of the present invention will be described in detail subsequently.

DESCRIPTION OF PREFERRED EMBODIMENTS

Referring now to the drawing in detail, the stud link 1 includes a plate-like link body 2 that is provided with elongated hook-end or attachment holes 3, 4 as well as posts or studs 5 to 7. In the longitudinal direction of the stud link 1, the attachment holes 3, 4 are spaced from one another and each serving for the attachment of a horizontal link of a tire chain. The lower longitudinal edge 8 of the link body in FIG. 1 serves as a tire contact surface and merges via rounded-off corners 9, 10 in parallel side edges 11, 12, which similarly adjoin the ends 13, 14 of the studs 5,7 via rounded-off portions. The tire contact surface 8 merges via longitudinal edges 15, 16, which are rounded-off in the manner of part of a circle, into parallel side faces 17, 18 of the link body 2. These side faces 17, 18 extend essentially over the height of the attachment holes 3, 4 at right angles to the longitudinal direction of the stud link 1. Between the attachment holes 3, 4 and the tire contact surface 8, the link body 2 is widened in an approximately bead or donut-like manner (FIG. 2), thus forming a first widened link body portion 24 that extends beyond the side faces 17, 18.

The studs 5 to 7 are provided on that side remote from the tire contact surface 8; these studs extend beyond base surfaces 19, 19' that extend parallel to the tire contact surface 8. The domes or studs 5 and 7 form wearing parts that are disposed at the sides of the stud link 1, while the stud 6 is disposed symmetrically relative to the transverse central plane 20 on the stud link 1 and equidistant from the side studs 5, 7. The stud 6 also forms a dome-like wearing part that has the same height as do the studs 5, 7. Recessed portions 21, 22, which are provided with the base surfaces 19', 19, are formed between the adjacent studs 7 and 6 and 5 and 6 respectively.

Between the base surfaces 19, 19' and the attachment holes 3, 4, the link body 2 is widened, as was the case on the other side of the attachment holes. This second widened link body portion 23, with the studs 5 to 7, is wider than the first widened link body portion 24. The link body portion 23 therefore extends beyond not only the two side faces 17 and 18 but also beyond the link body portion 24. However, the link body portion 23 is not as high as the link body portion 24. The maximum height of the link body portion 24 is preferably approximately twice as great as that of the link body portion 23. Each of the link body portions 23, 24 are embodied in such a way that they have their greatest height and thickness in the vicinity of the longitudinal central plane 25 of the stud link 1. The edges 26, 27 of the attachment holes 3, 4 have a roof-shape configuration. Similarly, the base surfaces 19, 19' are also roof shaped, so that in the region of the attachment holes 3, 4 and the wearing surfaces 19, 19', the link body portion 23 has an approximately trapezoidal cross-sectional shape.

The outer studs 5 and 7 are mirror symmetric relative to one another and in the view of FIG. 3 have an approximately elongated/tapered of triangle kite-shaped contour. The studs 5, 7 have side face portions 30, 30' or 31, 31' that diverge an are located spaced laterally outwardly from the side edges 12, 11 and that adjoin the side faces 17, 18 of the link body 2 via concave transition portions 28, 29 in a curved configuration joining side faces 17, 18 with the side face portion 30, 30' or 31, 31' with each other (FIG. 2). Transverse to the longitudinal central plane 25 of the link body 2, the side edges 11, 12 are curved in an approximately semicircular manner and adjoin the side face portions 30, 30' and 31, 31' of the studs 5, 7 approximately halfway along the width of the studs. Approximately halfway up the studs 5, 7, the side face portions 30, 30' and 31, 31' merge with side face portions 32, 32' and 33 33' that converge in the direction toward the ends 14, 13 of the wearing parts 5, 7. The side face portions 32, 32' and 33, 33' extend at an obtuse angle relative to the side face portions 30, 30' and 31, 31'. The side face portions 32, 32' and 33, 33' are interconnected via the roof-shaped ends 14 or 13 of the studs 5, 7. The roof surfaces of the ends 13 or 14 are disposed at a very large obtuse angle relative to one another, with the width of the ends 13 and 14 being approximately equal to the distance between the side faces 17, 18 of the link body 2. In the top view of FIG. 3, the ends 13, 14 have an approximately rectangular contour, with the outer narrow side being rounded off and the inner narrow side being roof shaped.

As shown in FIG. 2, the central stud 6, which is illustrated by dashed lines, has an essentially frustopyramidal configuration. The stud 6 includes side faces 35, 36 that converge from the base surfaces 19, 19' and that are interconnected via an end face 41 that is similar to the ends 13, 14 yet is narrower. The outer studs, 5 and 7, when seen from an end of said stud link, have two sides parallel to the longitudinal direction of the stud link with a frusto-pyramidal structure on top of them.

As shown in FIG. 1, the adjacent edges 37, 38 of the studs 5, 6 and 39, 40 of the studs 6, 7 converge, starting from the ends 13, 14, 41, in a direction toward the base surfaces 19, 19' of the link body 2, whereby the recessed portions 21, 22 and the stud 6 preferably have the same trapezoidal shape.

As shown in FIG. 3, the respectively facing edges 37 to 40 of the studs 5 to 7 are roof shaped similar to the end face 41 of the stud 6 and, the ends 13, 14 of the studs 5 and 7, which extend in a slightly curved manner in the longitudinal direction of the stud link 1. The stud ink 1 is symmetrical relative to its longitudinal central plane 25 and its transverse central plane 20. As shown in FIGS. 1 to 3, the outer studs 5 and 7, when viewed in the longitudinal and transverse directions of the stud link 1, are wider than the central stud 6. The stud 6 can engage in the ground in the manner of a spike, as a result of which an earthmovimg machine or the like that is provided with a tire chain having the previously described inventive stud links is assured of a high stability not only in an upright position but also when driving on an incline. The side face portions 30, 30' and 31, 31' offer a good contact surface for an adjacent gripping link within the same chain mesh, and assure that within the link arrangement of the tire chain no overlapping of the horizontal links occurs. The stud links are preferably embodied in such a way that adjacent stud links within the chain arrangement rest against one another via the side face portions before the horizontal links can be superimposed. At the same time, an improved traction can also be assured due to the described configuration of the studs 5 and 7 with their projecting edges.

The height of the studs 5 to 7 is approximately equal to one-third of the height of the link body 2.

As a consequence of the described inventive configuration of the wearing side of the stud link, the volume of those zones of the stud link that are hardened in the region of the wearing side is increased, so that a very long service life is obtained. As a result, the inventive stud link 1 is particularly suitable as a gripping link for cross-country chains, tire protection chains, and the like.

The present invention is, of course, in no way restricted to the specific disclosure of the specification and drawing, but also encompasses any modifications within the scope of the appended claims.

What is claimed is:

1. In a stud link for a tire chain, including a plate-shaped link body that has a tire contact surface and a wearing surface, with said link body having at least one attachment hole for connection of a chain link, and at least one central wearing element and two other wearing elements, one on each side of said central wearing element, with said wearing elements being disposed one after the other in longitudinal direction of said stud link, the improvement wherein:
    said wearing elements each have oppositely disposed side faces that extend essentially parallel to the longitudinal direction of said stud link, with at least one of said side faces of said central wearing element being recessed relative to the adjacent side face of said other wearing elements, said other wearing elements having a wider configuration than said central wearing element as well as consequently having greater traction as a result of projecting edges thereof, and in addition, volumes of harder regions of the stud link on the wearing side is increased so that the service lift of said stud link is increased.

2. A stud link according to claim 1, in which both of said side faces of said central wearing element are recessed relative to the adjacent side faces of said other wearing elements.

3. A stud link according to claim 2, in which each of said side faces of said other wearing elements is formed by at least two surface portions that are disposed at an obtuse angle to one another.

4. A stud link according to claim 3, in which said link body has oppositely disposed ends, with those surface portions that are disposed closer to said attachment hole diverging via concave transition portions extending from said ends in a direction toward said central wearing element.

5. A stud link according to claim 4, in which more outwardly disposed surface portions of said side faces of said other wearing elements converge via concave transition portions extending remote from said attachment hole.

6. A stud link according to claim 3, in which said surface portions of said side faces of said other wearing elements have essentially the same length.

7. A stud link according to claim 2, in which said central wearing element has an essentially frusto-pyramidal configuration.

8. A stud link according to claim 2, in which said link body has a first widened portion that adjoins said attachment hole remote from said tire contact surface, with said wearing elements extending beyond said first widened link body portion in a direction away from said attachment hole.

9. A stud link according to claim 8, in which recessed portions having base surfaces are formed between said wearing elements, with said base surfaces forming outer surfaces of said first widened link body portion on a side remote from said attachment hole.

10. A stud link according to claim 9, in which link body has its greatest width in the region of said first widened portion thereof.

11. A stud link according to claim 9, in which said link body has a second widened portion between said attachment hole and said tire contact surface, with the width of said first widened link body portion being greater than the width of said second widened link body portion.

12. A stud link according to claim 11, in which the thickness of said second widened link body portion, as measured in a longitudinal central plane of said stud link, is greater than the thickness of said first widened link body portion.

13. A stud link according to claim 11, in which the thickness of said second widened link body portion, as measured in a longitudinal central plane of said stud link, is approximately twice as great as the thickness of said first widened link body portion.

14. A stud link according to claim 2, in which said other wearing elements, when seen from an end of said stud link, have two sides parallel to the longitudinal direction of the stud link with a frusto- pyramidal structure on top of them.

15. A stud link according to claim 2, in which said wearing elements each have end faces remote from said tire contact surface, with the end face of said central wearing element being approximately one-fourth narrower than the end faces of said other wearing elements.

16. A stud link according to claim 15, in which said end faces of said other wearing elements when seen from a side of said stud link, are rounded off in the manner of part of a circle.

17. A stud link according to claim 2, in which said wearing elements have a height that is equal to approximately one-third of the height of said stud link.

18. A stud link according to claim 2, in which said other wearing elements, when seen from a side and/or end of said stud link, have a maximum width or thickness that is greater than that of said central wearing element.

19. A stud link according to claim 18, in which the maximum width or thickness of said other wearing elements is approximately twice as great as that of said central wearing element.

20. In a stud link for a tire chain, including a plate-shaped link body that has a tire contact surface and a wearing surface with said link body having at least one attachment hole for connection of a chain link, and at least one central wearing element and two other wearing elements, one on each side of said central wearing element, with said wearing elements being disposed one after the other in a longitudinal direction of said stud link, the improvement wherein:

said wearing elements each have oppositely disposed side faces the extend essentially parallel to the longitudinal direction of said stud link, with at least one of said side faces of said central wearing element being recessed relative to the adjacent side face of said other wearing elements, said other wearing elements having a wider configuration than said central wearing element as well as consequently having improved traction as a result of projecting edges thereof, and in addition, volumes of harder regions of the stud link on a wearing side is increased so that service life of said stud link is increased;

each of said side faces of said other wearing elements being formed by at least two surface portions that are disposed at an obtuse angle to one another; and said link body having oppositely disposed ends, with those surface portions that are disposed closer to said attachment hole diverging from said ends in a direction toward said central wearing element.

* * * * *